US010724444B2

United States Patent
Martinez et al.

(10) Patent No.: US 10,724,444 B2
(45) Date of Patent: Jul. 28, 2020

(54) AIR TURBINE STARTER

(71) Applicant: Unison Industries, LLC, Jacksonville, FL (US)

(72) Inventors: Luis Angel Martinez, Querétaro (MX); Rick L. Fiste, Vandalia, OH (US); Kenneth L. Magee, Beavercreek, OH (US)

(73) Assignee: Unison Industries, LLC, Jacksonville, FL (US)

( * ) Notice: Subject to any disclaimer, the term of this patent is extended or adjusted under 35 U.S.C. 154(b) by 320 days.

(21) Appl. No.: 15/660,047

(22) Filed: Jul. 26, 2017

(65) Prior Publication Data

US 2019/0032564 A1  Jan. 31, 2019

(51) Int. Cl.
*F02C 7/277* (2006.01)
*F02C 3/04* (2006.01)
*F02C 7/32* (2006.01)
*F01D 21/04* (2006.01)

(52) U.S. Cl.
CPC ............ *F02C 7/277* (2013.01); *F01D 21/045* (2013.01); *F02C 3/04* (2013.01); *F02C 7/32* (2013.01); *F05D 2220/32* (2013.01); *F05D 2260/4031* (2013.01); *F05D 2260/85* (2013.01)

(58) Field of Classification Search
CPC .......... F02C 7/268; F02C 7/275; F02C 7/277; F02C 7/055; F02C 7/32; F01D 19/00; F05D 2260/85
See application file for complete search history.

(56) References Cited

U.S. PATENT DOCUMENTS

| 3,056,580 | A | * | 10/1962 | Swank | F01D 1/023 415/101 |
|---|---|---|---|---|---|
| 4,044,550 | A | * | 8/1977 | Vermilye | F01D 21/045 60/39.091 |
| 4,509,896 | A | | 4/1985 | Linsker | |
| 4,518,310 | A | | 5/1985 | Coons | |

(Continued)

FOREIGN PATENT DOCUMENTS

| CN | 102889132 A | 1/2013 |
|---|---|---|
| CN | 202851156 U | 4/2013 |
| GB | 993711 | 6/1965 |

OTHER PUBLICATIONS

European Patent Office; Search Report in Application No. 18185027.2; dated Nov. 22, 2018; 9 pages; Hammersmith, London, UK.

(Continued)

*Primary Examiner* — Steven M Sutherland
(74) *Attorney, Agent, or Firm* — McGarry Bair, P.C.

(57) ABSTRACT

An air turbine starter for starting an engine, comprising a housing defining an inlet, an outlet, and a flow path extending between the inlet and the outlet for communicating a flow of gas there through. A turbine member is journaled within the housing and disposed within the flow path for rotatably extracting mechanical power from the flow of gas. A gear train is drivingly coupled with the turbine member, a drive shaft is operably coupled with the gear train, and an output shaft is selectively operably coupled to rotate with the engine. A containment screen is located within the housing downstream of the at least one turbine member.

12 Claims, 11 Drawing Sheets

(56) References Cited

U.S. PATENT DOCUMENTS

| | | |
|---|---|---|
| 4,960,085 A | 10/1990 | Coons |
| 6,533,541 B1 | 3/2003 | Farnsworth et al. |
| 2010/0192594 A1 | 8/2010 | Le Saint |
| 2012/0090300 A1* | 4/2012 | Champoux ........... F01N 3/0215 60/274 |

OTHER PUBLICATIONS

Chinese Patent Office, Office Action re Corresponding Application No. 2018108277063, dated Jun. 11, 2020, 8 pages, China.

* cited by examiner

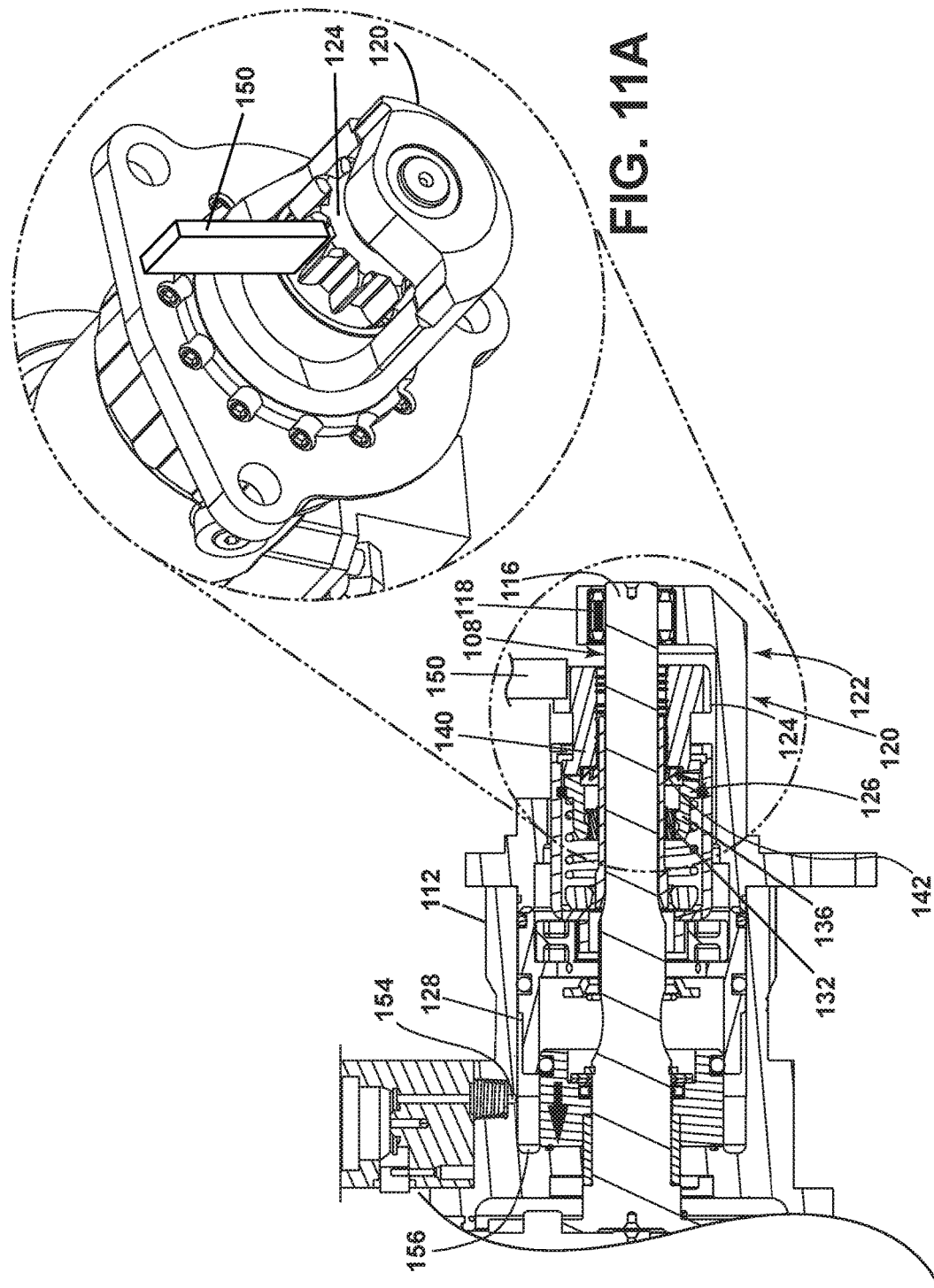

US 10,724,444 B2

AIR TURBINE STARTER

BACKGROUND

An aircraft engine, for example a gas turbine engine, is engaged in regular operation to an air turbine starter. Air turbine starters are typically mounted to the engine through a gearbox or other transmission assembly. The transmission transfers power from the starter to the engine to assist in starting the engine. The internal components of both the gas turbine engine and the air turbine starter spin together such that the air turbine starter can be used to start the engine.

BRIEF DESCRIPTION

In one aspect, the present disclosure relates to air turbine starter for starting an engine including at least one turbine member that is rotatable about a rotational axis, a housing defining an interior and an exterior and having a portion thereof radially surrounding the at least one turbine member and defining a pathway along which a flow of gas passes there through to interact with the at least one turbine member, and a containment screen located within the interior downstream of the at least one turbine member.

In another aspect, the present disclosure relates to method of forming an air turbine starter the method including enclosing a turbine member within a peripheral wall between an inlet and a set of outlets to define a fluid pathway and forming a tortuous path between the turbine member and an exterior of the peripheral wall by way of disposing a containment screen between the turbine member and the set of outlets.

In yet another aspect, the present disclosure relates to a containment screen for an air turbine starter affixed within a housing that includes a peripheral wall surrounding a turbine member and where the containment screen spans an interior of the peripheral wall downstream of the turbine member.

BRIEF DESCRIPTION OF THE DRAWINGS

In the drawings:

FIG. 8A is a perspective view of a portion of the starter of FIG. 2 with portions in a tooth-to-tooth event, in accordance with various aspects described herein.

FIG. 11 is a cross-sectional view of a portion of the starter of FIG. 2 with a pinion gear in an engaged position, in accordance with various aspects described herein.

FIG. 11A is a perspective view of a portion of the starter in the position illustrated in FIG. 11, in accordance with various aspects described herein.

DETAILED DESCRIPTION OF THE EMBODIMENTS

Figure 1:
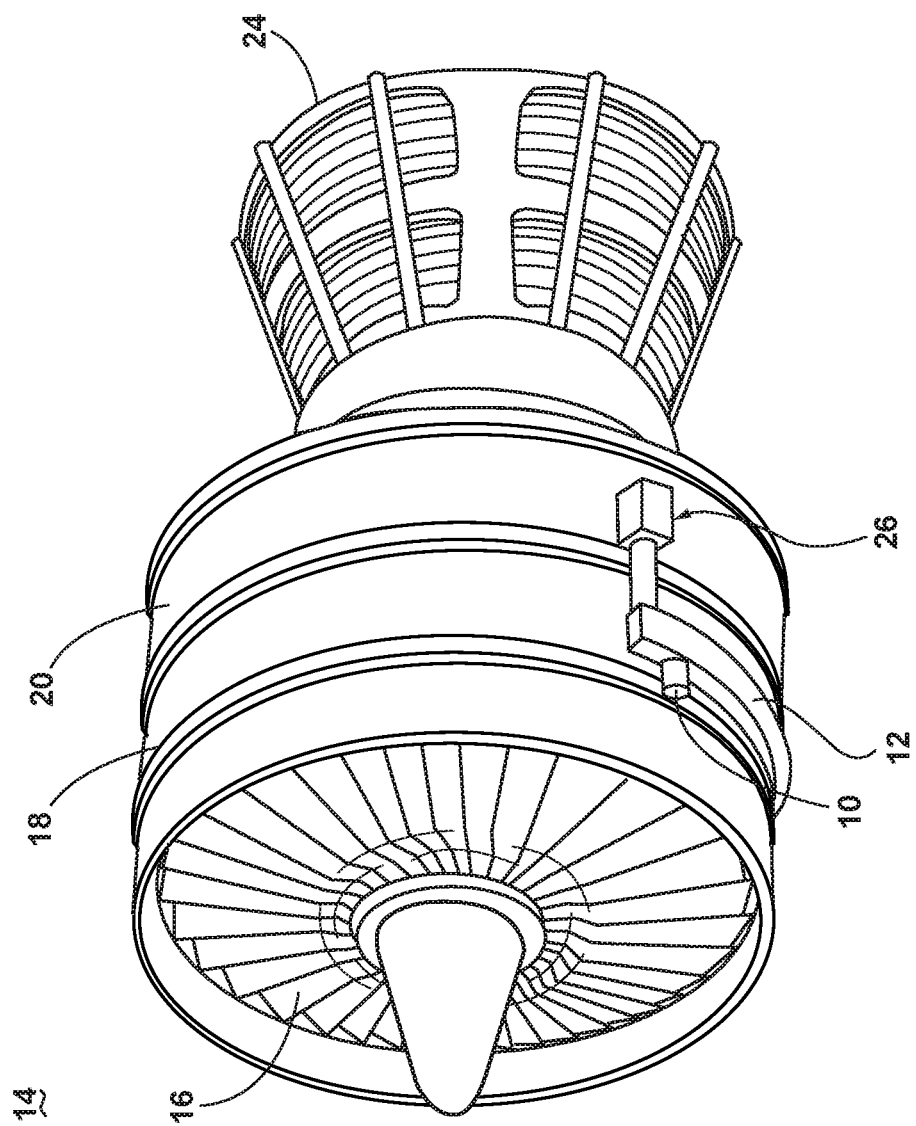
FIG. 1 is a schematic perspective view of a turbine engine with an accessory gearbox and a starter in accordance with various aspects described herein.

The present disclosure is related to a driving mechanism generating kinetic motion in the form of a rotating shaft coupled with a piece of rotating equipment. One non-limiting example is an air turbine starter. The starter can have various applications including, but not limited to, starting a gas turbine engine, starting a reciprocating engine, starting a marine engine, or the like.

All directional references (e.g., radial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order, and relative sizes reflected in the drawings attached hereto can vary.

As used herein, the term "forward" or "upstream" refers to moving in a fluid flow direction toward the inlet, or a component being relatively closer to the inlet as compared to another component. The term "aft" or "downstream" refers to a direction toward the outlet of a flow path relative to the air turbine starter, or a component being relatively closer to the outlet as compared to another component. Additionally, as used herein, the terms "radial" or "radially" refer to a dimension extending between a center longitudinal axis of the engine and an outer engine circumference. It should be further understood that "a set" can include any number of the respectively described elements, including only one element.

Referring to FIG. 1, a starter motor or air turbine starter 10 is coupled to an accessory gear box (AGB) 12, also known as a transmission housing, and together are schematically illustrated as being mounted to a turbine engine 14 such as a gas turbine engine. The turbine engine 14 includes an air intake with a fan 16 that supplies air to a high pressure compression region 18. The air intake with a fan 16 and the high pressure compression region collectively are known as the 'cold section' of the turbine engine 14 upstream of the combustion. The high pressure compression region 18 provides a combustion chamber 20 with high pressure air. In the combustion chamber, the high pressure air is mixed with fuel and combusted. The hot and pressurized combusted gas passes through a turbine region 22 before exhausting from the turbine engine 14. As the pressurized gases pass through the turbine region 22, the turbines extract rotational energy from the flow of the gases passing through the turbine engine 14. The high pressure turbine of the turbine region 22 can be coupled to the compression mechanism (not shown) of the high pressure compression region 18 by way of a shaft to power the compression mechanism.

The AGB 12 is coupled to the turbine engine 14 at turbine region 22 by way of a mechanical power take-off 26. The mechanical power take-off 26 contains multiple gears and means for mechanical coupling of the AGB 12 to the turbine engine 14. Under normal operating conditions, the power take-off 26 translates power from the turbine engine 14 to the AGB 12 to power accessories of the aircraft for example but not limited to fuel pumps, electrical systems, and cabin environment controls. The air turbine starter 10 is often mounted near at least one of the AGB 12 or the power take-off 26 of the turbine engine 14. For example, the air turbine starter 10 can be mounted on the outside of either the air intake region containing the fan 16 or on the core near the high pressure compression region 18.

During operation the air turbine starter 10 can be used to initiate the rotation of the engine. While the air turbine starter 10 has been illustrated as being utilized in the environment of an aircraft engine, it will be understood that the disclosure is not so limited. The air turbine starter can be used in any suitable environment to initiate rotation including in other mobile or non-mobile applications as desired.

Figure 2:
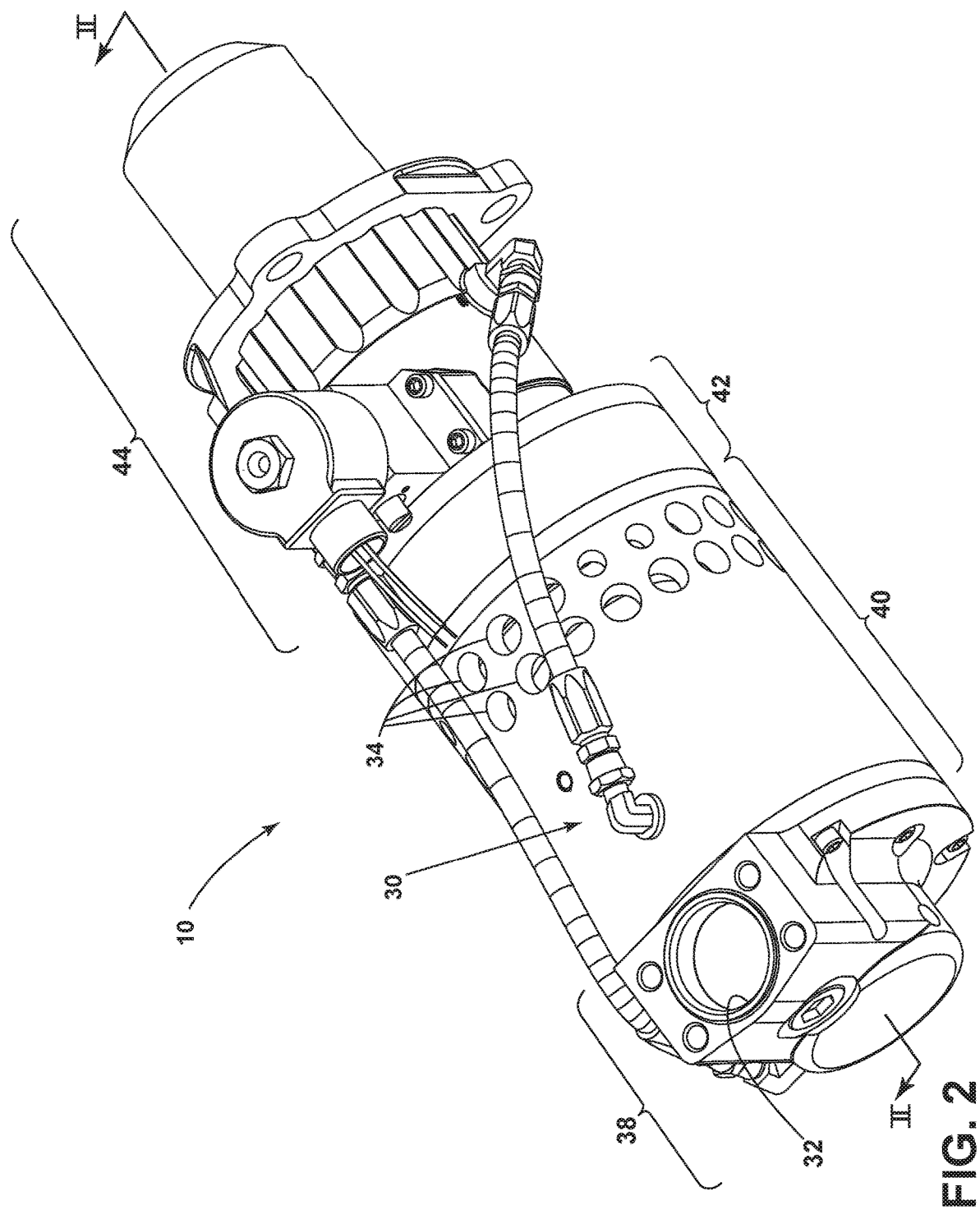
FIG. 2 is a perspective view of a starter that can be utilized in the engine assembly of FIG. 1, in accordance with various aspects described herein.

Referring now to FIG. 2, an exemplary air turbine starter 10 is shown in greater detail. Generally, the air turbine starter 10 includes a housing 30 defining an inlet 32 and a set of outlets 34. A flow path 36, illustrated schematically with an arrow, extends between the inlet 32 and set of outlets 34 for communicating a flow of fluid, including, but not limited to gas, compressed air, or the like, there through. The housing 30 can be made up of two or more parts that are combined together or can be integrally formed as a single piece. In the depicted aspects of the disclosure, the housing 30 of the air turbine starter 10 generally defines, in an in-line series arrangement, an inlet assembly 38, a turbine section 40, a gear box 42, and a drive section 44. The air turbine starter 10 can be formed by any materials and methods, including, but not limited to, die-casting of high strength and lightweight metals such as aluminum, stainless steel, iron, or titanium. The housing 30 and the gear box 42 can be formed with a thickness sufficient to provide adequate mechanical rigidity without adding unnecessary weight to the air turbine starter 10 and, therefore, the aircraft.

Figure 3:
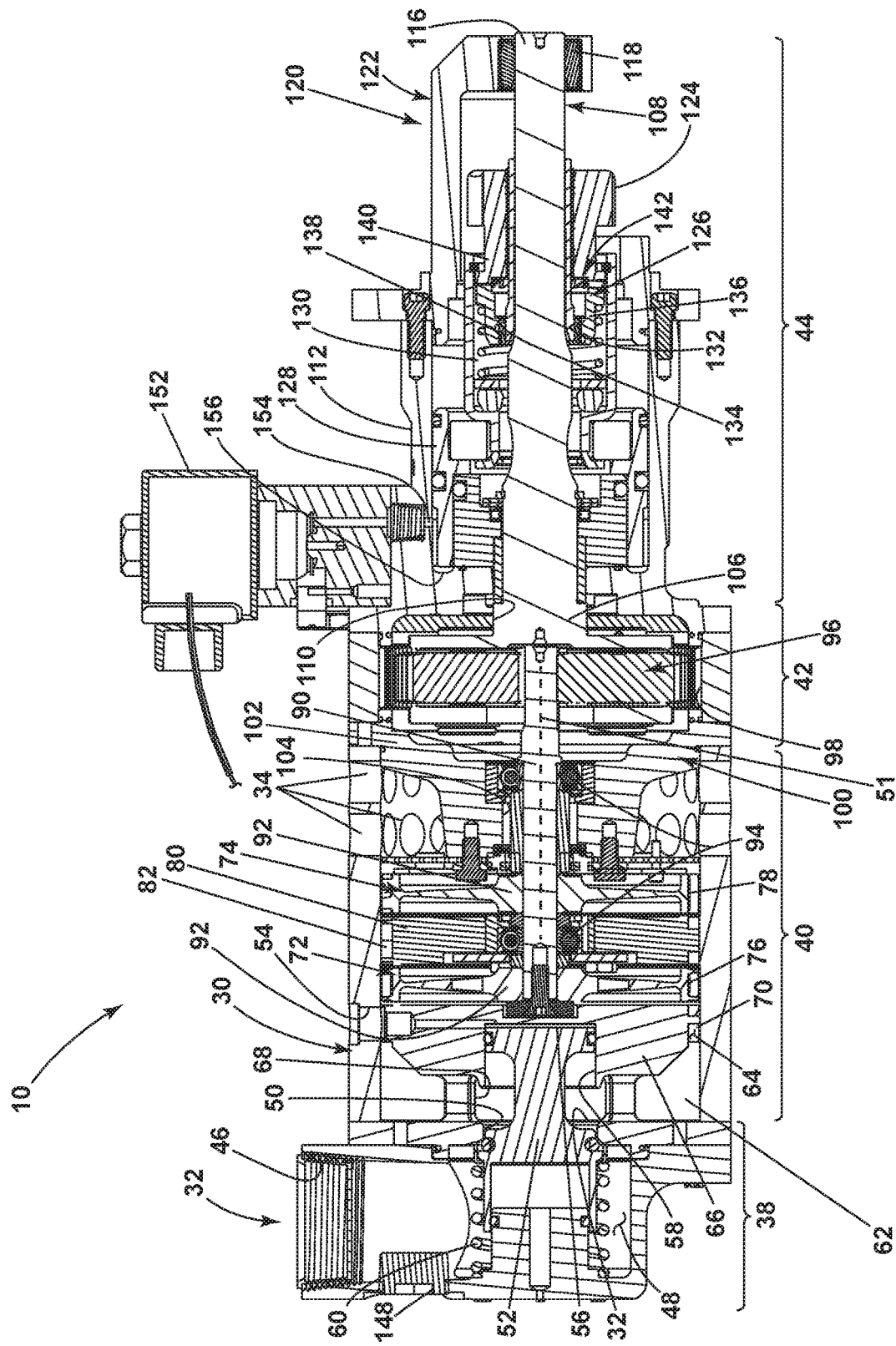
FIG. 3 is a cross-sectional view of the starter of FIG. 2, in accordance with various aspects described herein.

A seen better in FIG. 3 the inlet assembly 38 includes an inlet coupling 46 that can be connected with any suitable conduit conveying a flow of gas including, but not limited to, pressurized gas. In one non-limiting example the gas is air and is supplied from a source of gas flow, including, but not limited to, a ground-operating air cart, an auxiliary power unit, or a cross-bleed start from an engine already operating. The inlet coupling 46 is fluidly coupled with an inlet plenum 48, which directs pressurized air into the turbine section 40 via an inlet opening 50. An inlet valve 52 can selectively open and close the inlet opening 50. The inlet opening 50 is in-line with the turbine section 40. More specifically, an axis of rotation 51 has been illustrated for the turbine section 40. The inlet opening 50 is aligned with the axis of rotation 51. While the inlet coupling 46 is oriented in an upwards direction it will be understood that feed of air through the inlet opening 50 via the inlet valve 52 is in-line with the turbine section 40. This allows for a more compact air turbine starter 10.

The inlet valve 52 can be any suitable inlet valve and has been exemplarily illustrated herein as a pneumatic inlet valve. The inlet valve 52 is disposed at least partially within the inlet opening 50 and is moveable between an open position and a closed position. A pneumatic actuator can be utilized to move the inlet valve 52 into its open position. The source of pneumatic power to the actuator can be pressurized air supplied from, for example, an auxiliary power unit (APU), bleed air from another engine compressor, a ground cart, or the like. In some instances, the pressurized air supplied to the air turbine starter 10 and the inlet valve 52 is non-regulated, and at a pressure magnitude greater than what can be needed for the air turbine starter 10 operation. Hence, some inlet valves 52 can also be configured as a pressure regulating valve, to thereby regulate the pressure of the air flow to the air turbine starter.

Figure 7:
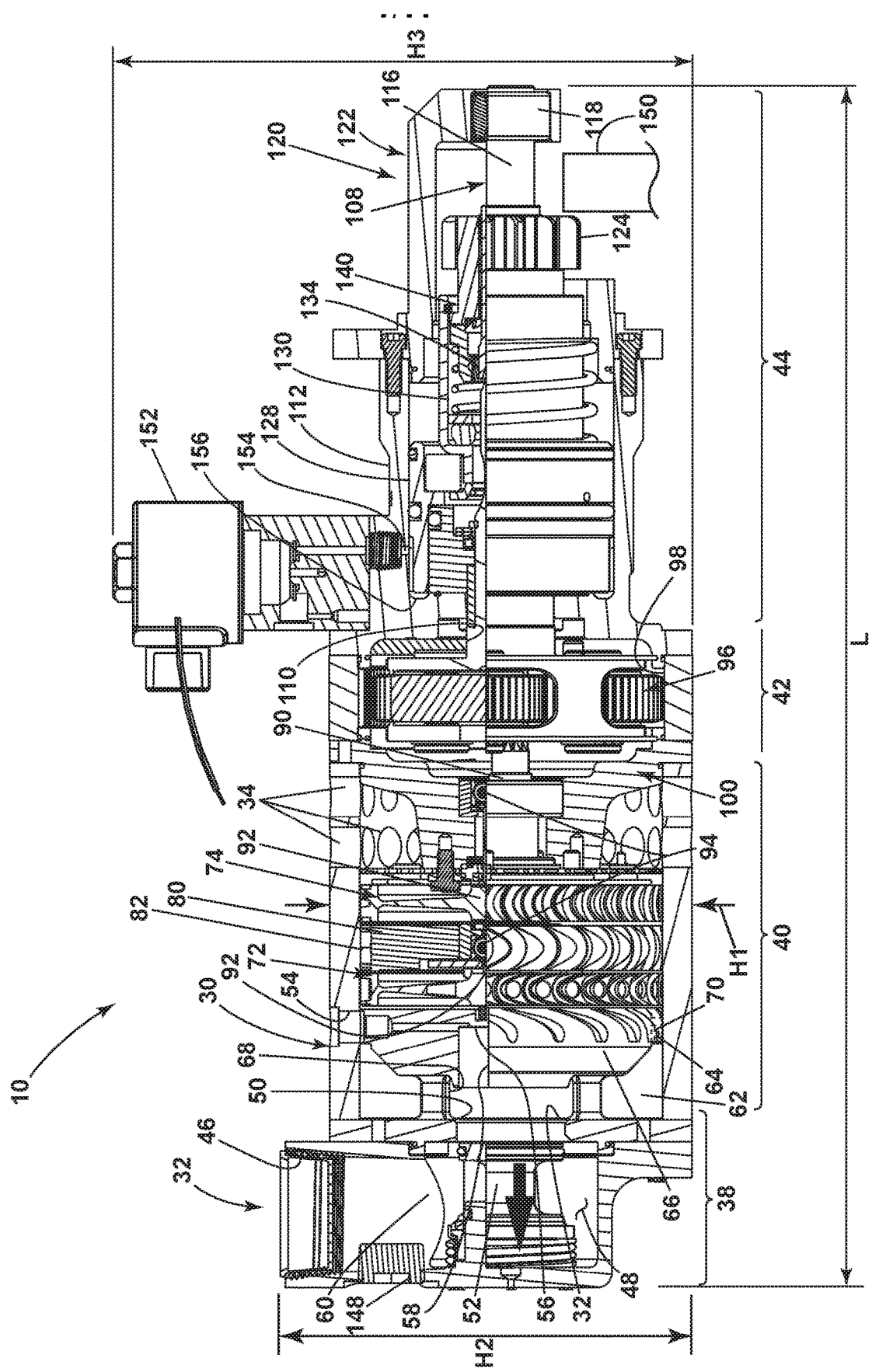
FIG. 7 is a partially cut away perspective view of the starter of FIG. 2 with an inlet valve in a second position, in accordance with various aspects described herein.

The pressurized air can be supplied at aperture 54 into a cavity 56 in a valve seat 58. Regardless of the specific source of the pressurized air, the air supplied pushes the inlet valve 52 from the closed position to an open position (FIG. 7). A biasing element 60 can be included to bias the inlet valve 52 toward the closed position when pressurized air is no longer supplied to the cavity 56. The biasing element 60 can be any suitable mechanism and has been illustrated herein, by way of non-limiting example, as a coil spring.

If the inlet valve 52 is in the open position, pressurized air is directed into the inlet plenum 48, flows through the inlet 32 of the housing, a flow channel 62, and exits the housing 30 via the set of outlets 34. The flow channel 62 includes an axial flow portion 64 formed through a ring assembly 66 that is mounted within the housing 30 proximate the inlet 32. The ring assembly 66 includes a central aperture 68 and a set of circumferentially spaced nozzles 70 (better illustrated in FIG. 4) that are integral with and projected radially from a surface of the ring assembly 66. An inlet to the flow channel 62 is provided by the central aperture 68 and the only outlets are those defined by the nozzles 70 of the ring assembly 66.

Within the turbine section 40 there are include a set of rotors or turbine members. In the illustrated example, a first turbine member 72 and a second turbine member 74 form a twin-turbine member and are rotationally mounted within the housing 30 at the turbine section 40 and disposed within the flow path 36 (FIG. 5) for rotatably extracting mechanical power from the flow of gas along the flow path 36. The first turbine member 72 and second turbine member 74 define first a second stages, respectively, of the turbine section 40. In particular, the first turbine member 72 and second turbine member 74 include wheels having a number of vanes or nozzles along their periphery. The nozzles 76 of the first turbine member 72 are aligned with the nozzles 70 of the ring assembly 66 and in a closely spaced relation to the inner surface of the housing 30. An intermediate ring 80 having nozzles 82 can be located in between the first turbine member 72 and second turbine member 74. The nozzles 78 of the second turbine member 74 can be aligned with the nozzles 82 of the intermediate ring 80 and in a closely spaced relation to the inner surface of the housing 30.

The first turbine member 72 can be considered a first stage rotor and the second turbine member 74 can be considered a second stage rotor. Similarly the ring assembly 66 can be considered a first stator or first nozzle stage and the intermediate ring 80 can be considered a second stator or second nozzle stage. The ring assembly 66 has been illustrated as including sixteen nozzles 70. The intermediate ring has been illustrated as including twenty-four nozzles 82. Both the first and second nozzle stages have an increased number of nozzles than what are typically found in legacy starters of this size (14 and 22, respectively). The additional nozzles in combination with higher allow the air turbine starter 10 to consume more air and at higher pressure over legacy products. This allows for a higher torque of 70 psig, which is 26% more than other legacy starters. While sixteen nozzles 70 and twenty-four nozzles 82 are described, additional or fewer nozzles can be included on at least one of ring assembly 66, intermediate ring 80, or the like. For example, in one non-limiting example, the intermediate ling 80 can include twenty-five nozzles 82.

The first turbine member 72 and second turbine member 74 are coupled via an output shaft 90. More specifically, the first turbine member 72 and second turbine member 74 can each include a central hub portion 92 that is keyed to a first portion of the output shaft 90. The output shaft 90 is rotatably supported by a pair of bearings 94.

The output shaft 90 acts as a rotational input to a gear train 96, disposed within an interior 98 of the gear box 42. The gear train 96 can include any gear assembly, including, but not limited to, a planetary gear assembly or a pinion gear assembly. The output shaft 90 couples the gear train 96 to the first and second turbine members 72, 74 allowing for the transfer of mechanical power to the gear train 96. The interior 98 of the gear box 42 can contain a lubricant (not shown), including, but not limited to, a grease or oil to provide lubrication and cooling to mechanical parts contained therein such as the gear train 96.

A retention member 100 can be mounted to the gear box 42 and can be included to cap off the interior 98 of the gear box 42. The retention member 100 can include a plate 102 with an aperture 104 through which the output shaft 90 can extend. While the term "plate" has been utilized herein it will be understood that such portion of the retention member 100 need not be flat. In the illustrated example, the plate 102 includes a non-planar or stepped profile, by way of non-limiting example.

It will be understood that the retention member 100 can have any suitable shape, profile, contour, etc. In the illustrated example, a peripheral portion can be mounted between the housing and the gear box and the plate 102 includes a central portion that extends into the housing with the aperture 104 located therein. The body or plate 102 can include a frustro-conical portion. This need not be the case and the retention member 100 can be any suitable retainer configured to impede or limit movement of the lubricant from an interior of the gear box 42. It will be understood that the output shaft 90 and the retention member 100 can form a fluid-tight seal.

The retention member 100 is adapted to maintain the grease within the gear box 42 for a life of the gear box. It is contemplated that when a lubricant, such as grease, is located within the interior 98 that the retention member 100 can retain the lubricant within the interior 98. This limits migration of lubricants within the housing 30 and results in improved gear lubrication so that the gear box 42 does not dry out as has been an issue in conventional assemblies. Further, no additional amount of lubricant needs to be added during the life of the assembly.

An output of the gear train 96 can be operably coupled to a first end 106 of a drive shaft 108. The rotatable drive shaft 108 can be constructed by any materials and methods, including, but not limited to extrusion or machining of high strength metal alloys such as those containing aluminum, iron, nickel, chromium, titanium, tungsten, vanadium, or molybdenum. The diameter of the drive shaft 108 can be fixed or vary along its length.

An aperture 110 can be located within the gear box 42 through which the first end 106 of the drive shaft 108 can extend to mesh with gear train 96. A second housing 112 can be operably coupled with the gear box 42. The drive shaft 108 can be rotatably mounted within the second housing 112.

For example, a second end 116 of the drive shaft 108 can be mounted for rotation within a bearing unit 118 supported and contained in an end housing 120. The end housing 120 can be mounted to the second housing 112 in any suitable manner. The end housing 120 is formed and mounted to have its inner wall surface in a concentric closely spaced relation to the structure, which it contains and has one end thereof abutted and bolted to the end of the second housing 112. The second housing 112 and the end housing 120 are fixed to be coaxial with the housing 30 and second housing 112. In this manner the housing includes a plurality of sections mounted together.

Figure 4:
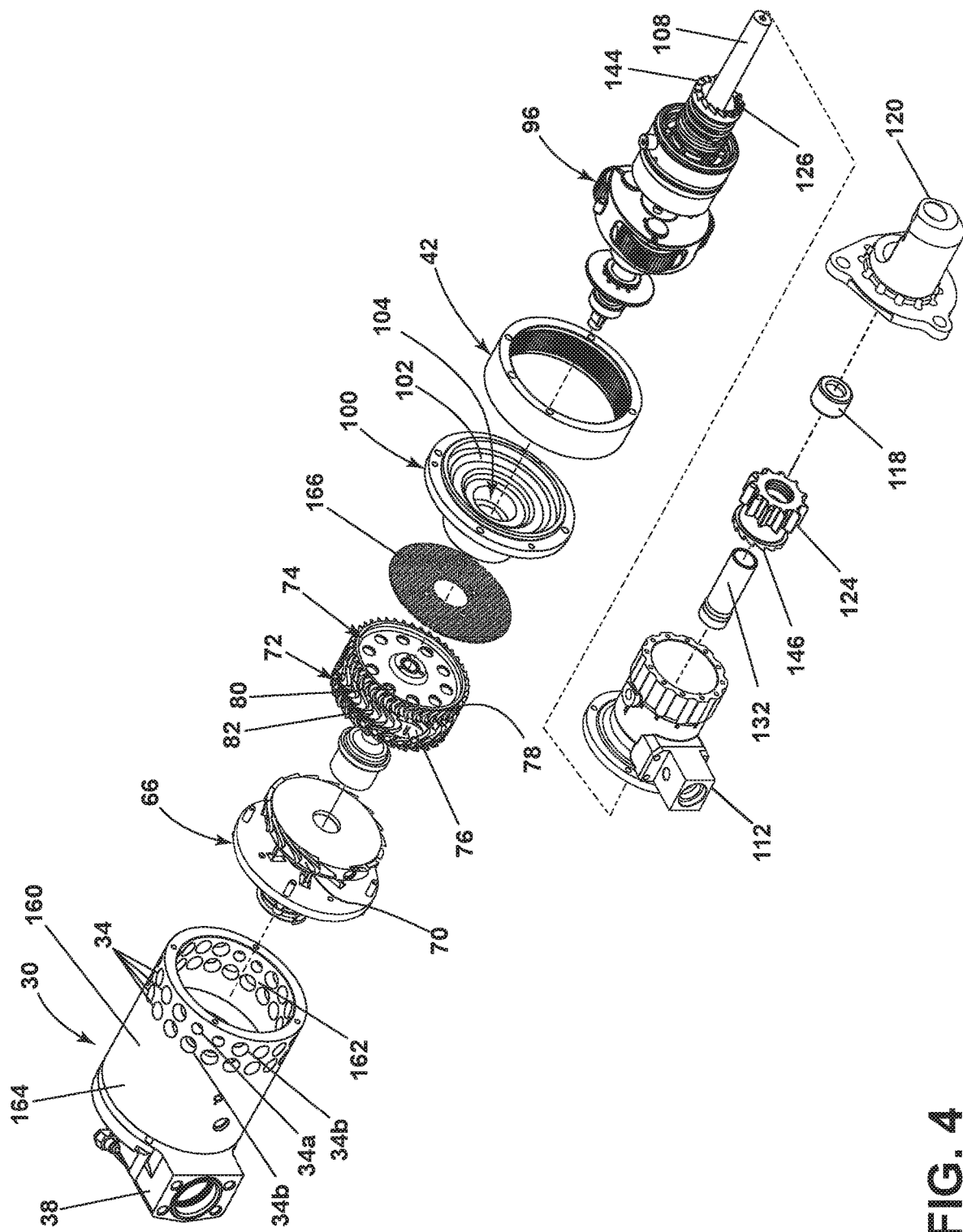
FIG. 4 is a partially exploded view of the starter of FIG. 2, in accordance with various aspects described herein.

The end housing 120 is cut away at an outermost end portion 122 to expose a portion of the drive shaft 108 and a pinion gear 124 operably coupled thereto. In the illustrated example, the end portion 122 can be considered the bottom of the end housing 120 and can expose an underside of the drive shaft 108 and pinion gear 124. The end housing 120 also houses a clutch assembly 126 operably coupled to the drive shaft 108. In the illustrated example, a spline 132 having a helical threaded portion 134 (FIG. 7) operably couples the drive shaft 108 and clutch assembly 126. The clutch assembly 126 can include any manner of coupling including, but not limited to, gears, splines, a clutch mechanism, or combinations thereof. In the illustrated example, the clutch assembly 126 includes a clutch spline 136 having a complimentary internal helical thread 138 with that of the helical thread portion 134. A second clutch member 140 can selectively operably couple to the clutch spline 136 via a dentil connection 142. More specifically, the opposing or adjacent faces of the clutch spline 136 and second clutch member 140 are provided with complementing mutually engageable inclined torque transmitting dentil teeth 144 and 146, respectively (FIG. 4). The dentil teeth 144 and 146 are by way of non-limiting, example, of the saw-tooth variety to provide a one-way overrunning clutch connection.

The pinion gear 124 is illustrated as being positioned on the drive shaft 108 at the second end 116 immediately adjacent an output side of the clutch assembly 126. More specifically, the pinion gear 124 is coupled to or integrally formed with the second clutch member 140. The pinion gear 124 is adapted for movement into and out of engagement with an engine ring gear 150 (FIG. 7), for example, along the coaxial direction of the drive shaft 108. The air turbine starter 10 is mounted in connection with the turbine engine 14 so that the drive shaft 108 is parallel to gear teeth on and defining the peripheral limit of the engine ring gear 150.

An assembly for moving the pinion gear 124 toward or away from the engine ring gear 150 can include a piston 128, an indexing assembly 130, and a solenoid 152. The solenoid 152 can be any suitable solenoid. In the illustrated example, the solenoid 152 controls the flow of air into an aperture 154 coupled to a closed end 156 of the second housing 112. The solenoid 152 can also control the airflow into valving aperture 54.

FIG. 4 better illustrates that the housing 30 includes a peripheral wall 160 defining an interior 162 and an exterior 164. The set of outlets 34 are located at a mid-section of the housing along the peripheral wall 160 after the second turbine member 74. In the illustrated example, the peripheral wall 160 is a cylindrical peripheral wall. The peripheral wall can be formed in any suitable manner including that it can have a wall thickness of 2.54 millimeters (0.100 inch). The set of outlets 34 can span a portion of the circumference of the peripheral wall including that they can span 270 degrees or more of the circumference. In the illustrated example, the set of outlets 34 include a plurality of outlets or apertures that are circumferentially spaced about 360 degrees of the peripheral wall 160. The set of outlets 34 are illustrated as including multiple rows of outlets although it will be understood that this need not be the case. The outlets 34 can be located, arranged, or oriented in any suitable locations and manners. The set of outlets 34 is illustrated as including exhaust ports 34*a* and 34*b* that vary in size. Such size differentiation can be purely aesthetic in nature or can be utilized to fulfill other requirements such as sized to create small exhaust openings, tapping of screw ports, etc. In the illustrated example, there are illustrated thirty-two larger exhaust ports 34*a* and eight smaller exhaust ports 34*b*. It is contemplated that the exhaust ports 34*a* and 34*b* can be of any suitable size including, but not limited to, that the larger exhaust ports 34*a* can be 15.875 millimeters (⅝ of an inch) and the smaller exhaust ports 34*b* can be 11.1125 millimeters (⁷⁄₁₆ of an inch). It will be understood that alternatively only one size exhaust port can be included, that additional sizes can be included, and that any number of ports of the various sizes can be included. The outlets 34 can include any suitable ports for providing a low resistance escape path for the gas to leave the air turbine starter 10. While alternative shapes, profiles, contours can be utilized, round outlets 34 are illustrated for exemplary purposes. Further, it will be understood that the larger the area the outlets 34 cover, the lower resistance for the gas and the lesser the amount of back pressure. The back pressure can be measured between the second stage rotor and the exhaust. Aspects of the disclosure result in 1 psig of pressure or less. This is lower than legacy products that have a back pressure of up to 10 psig.

Figure 5:
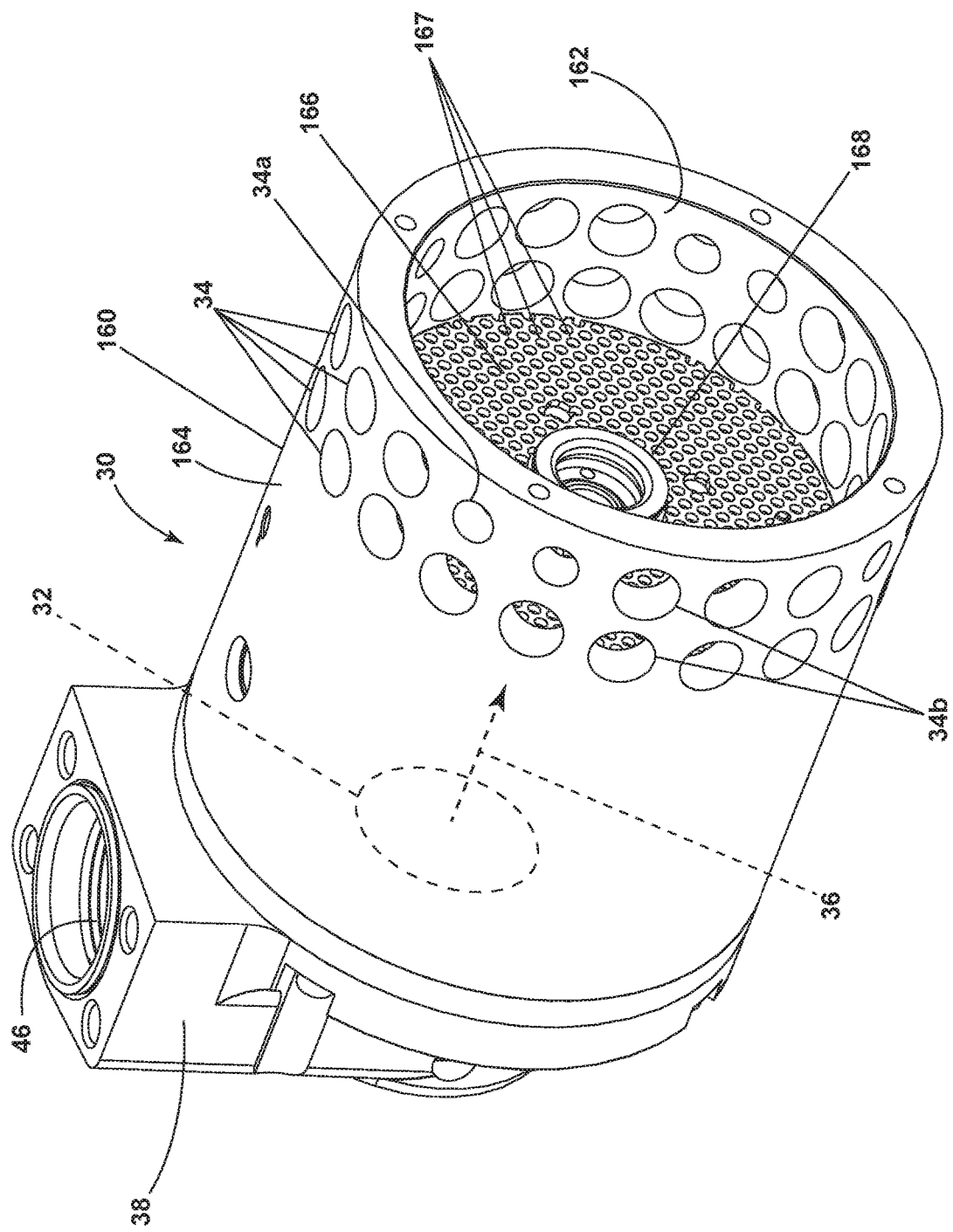
FIG. 5 is a perspective view of a portion of the starter of FIG. 2, in accordance with various aspects described herein.

FIG. 5 more clearly illustrates a screen or containment screen 166 disposed relative to the housing 30. The containment screen 166 can be located within the interior 162 of the housing 30 upstream of the set of outlets 34. The containment screen 166 can be located proximate to the second turbine member 74. More specifically, it can be closely located to the exhaust of the second turbine member 74 and axially between the second turbine member 74 and the set of outlets 34. While it can be mounted in any suitable manner within the housing 30, the containment screen 166 has been illustrated as being mounted to a bearing hub 168 of the bearing 94, which forms an axial retention device adapted to axially retain the containment screen 166 relative to the housing 30. The containment screen 166 can extend to abut the peripheral wall forming the housing 30.

The containment screen 166 can be formed in any suitable manner including that it can include a plate with openings 167, perforated sheet with openings 167, or a mesh screen with openings 167. The containment screen 166 can be formed of any suitable material including, but not limited to, stainless steel and have any suitable sized openings and percent open area. In the illustrated example, the containment screen 166 has 60% open area as to provide better containment but not substantially increase the back pressure.

Figure 6:
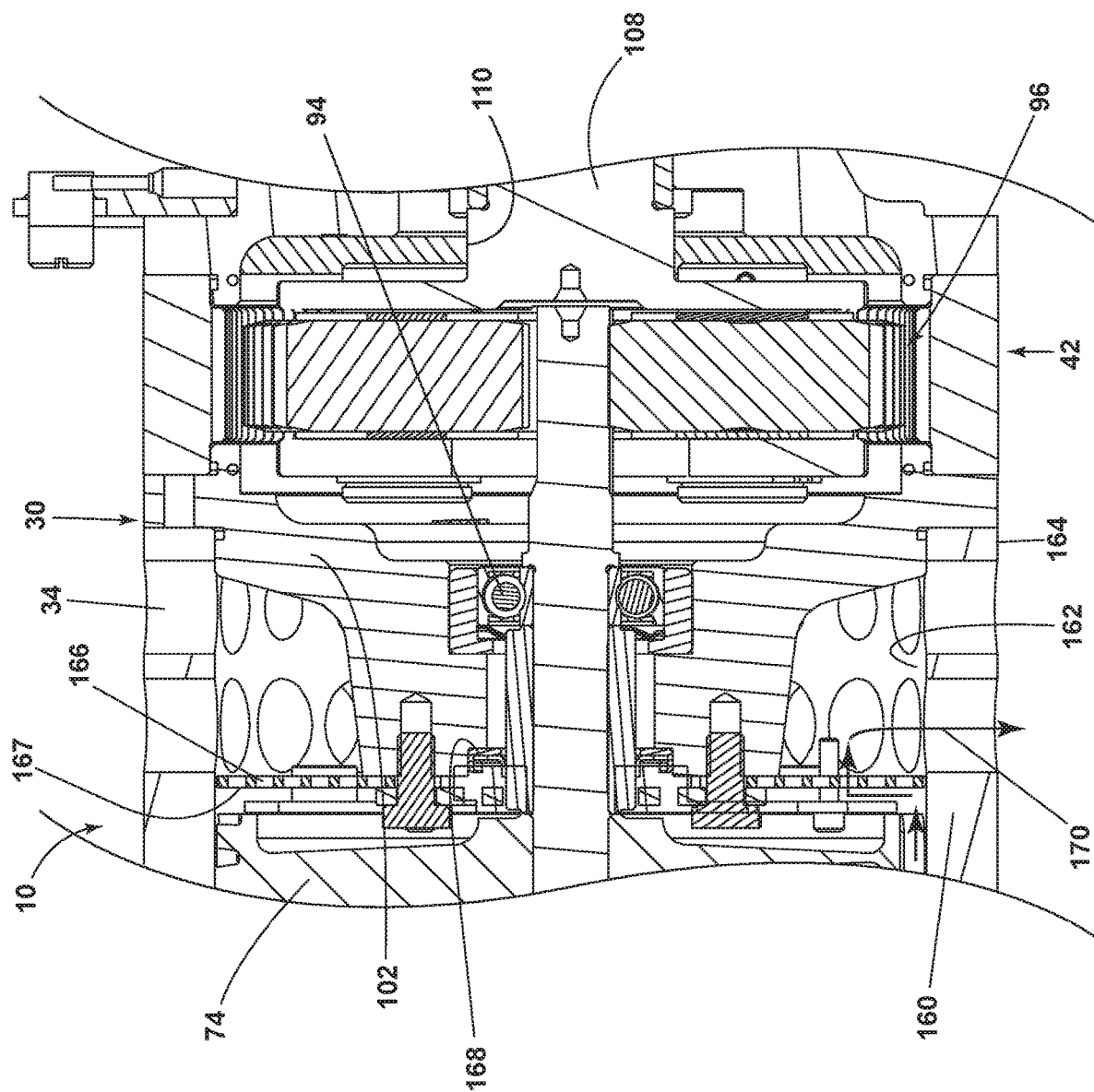
FIG. 6 is an enlarged cross-sectional view of a portion of the starter of FIG. 2, in accordance with various aspects described herein.

Among other things, the containment screen 166 in combination with the set of outlets 34 create a tortuous path for the flow of gas out of the air turbine starter 10. The containment screen 166 in combination with the set of outlets 34 and their small size lessens the chance that sparks, particulates, or other debris will escape the housing 30. FIG. 6 is an enlarged cross-sectional view of a portion of the air turbine starter 10 illustrating an exemplary tortuous path 170. The creation of such tortuous paths can be particularly advantageous when metal or other contaminants enter the housing via the inlet 32. Such debris can create sparks within the interior 162 of the housing 30 and the inclusion of the containment screen 166 along with the small diameter outlets 34 deters the sparks from leaving the housing 30. The containment screen 166 along with the small diameter outlets 34 can also act as several forms of mechanical containment should a portion of the air turbine starter 10 fail.

FIG. 7 is a partially cut away perspective view of the air turbine starter and illustrates exemplary dimensions for the air turbine starter 10. For example, a total length (L) of the air turbine starter 10 can be approximately less than 50 cm (19.7 inches). Further still, the length of the air turbine starter 10 from the engine mounting surface (at 112) to the aft end of the starter at inlet 32 can be less than 39 cm (15.33 inches). The extension of the end portion 122 can be less than 9.7 cm (3.82 inches). By way of non-limiting example, the diameter (H1) of the air turbine starter 10, which generally includes the height except for the inlet assembly 38, solenoid valve 152 and hoses/fittings can be equal of less than 15.63 cm (6.15 inches) including that the cylindrical portion of the housing 30 can have a diameter of 14.6 cm (5.75 inches) or less. The height including the inlet assembly (H2) can be equal to or less than 17.17 cm (6.76 inches). The height including the solenoid valve 152 (H3) can be equal or less than 23.5 cm (9.25 inches).

FIG. 7 also illustrates that aspects of the present disclosure include that a secondary supply port or air supply port 148 can be included in the inlet assembly 38. It is contemplated that the air turbine starter 10 can serve a dual function or purpose and also act as a pressurized air supply point. More specifically, the air supply port 148 is coupled to the flow of the pressurized gas in the air turbine starter 10 and adapted to provide a secondary supply of the pressurized gas from the air turbine starter 10. The air supply port 148 can allow a user access to pressurized air located in the plenum 48 of the housing 30, preferably when the inlet valve 52 is in the closed position. For example, in one non-limiting aspect of the disclosure, the air supply port 148 can be adapted with an interface for selectably providing a pressurized air or gas port for another pneumatic tool or device. In this sense, the air supply port 148 can provide a port 148 enabled to allow a user or operator to receive or utilize the gas from the pressurized source via the air turbine starter 10, without additional intervening structures, flow paths, connectors, interface converters, or the like. In one non-limiting aspect of the disclosure, the air supply port 148 can include the form of a ⅝-inch (1.5875 cm) national pipe taper (NPT) port. While not illustrated it will be understood that a plug can be included in the air turbine starter 10 and such plus can be adapted to selectively close the secondary supply port 148.

FIG. 7 also illustrates the inlet valve 52 in an open position. During operation, the solenoid 152 can control a flow of air supplied to the aperture 54, for example via tubing (not shown). As air fills the cavity 56 the inlet valve 52 pushes against the biasing element 60 and the inlet valve 52 is moved to the open position as shown in FIG. 7. Pressurized air directed into the inlet plenum 48 then flows through the inlet 32 of the housing, a flow channel 62, and drives the first and second turbine members 72 and 74 before exiting a mid-section of the housing 30 via the set of outlets 34. Thus, when the inlet valve 52 is in the open position, compressed air can flow through the inlet valve 52, and into the turbine section 40. The pressurized air impinges upon the first and second turbine members 72 and 74 causing them to rotate at a relatively high rate of speed.

Because the inlet valve is described as being powered by pressurized air it can be considered a pneumatic valve. Although it will be understood that alternative valve mechanisms and actuators can be utilized. When air is no longer supplied into the cavity 56, the biasing element 60 can return to its uncompressed state and move the inlet valve 52 back to the closed position (FIG. 3). When the inlet valve 52 is in the closed position, compressed air flow to the turbine section 40 can be prevented.

In normal operation, when it is desired to start the turbine engine 14, the pinion gear 124 is shifted to the right so that pinion gear 124 engages engine ring gear 150. More specifically, when the first and second turbine members 72 and 74 are driven they cause the output shaft 90 to rotate. The output shaft 90 acts as an input to the gear train 96, which in turn causes the drive shaft 108 to rotate. Torque is transmitted through the spline 132 from threaded portion 134 to clutch assembly 126, to pinion gear 124 via dentil connection, and finally to the engine ring gear 150.

As the engine 14 fires and becomes self-operating, the engine ring gear 150 can drive pinion at a speed greater than that of the drive shaft 108. Dentil teeth 144 and 146 will slip so that the air turbine starter is not driven at high engine speeds.

Figure 8:
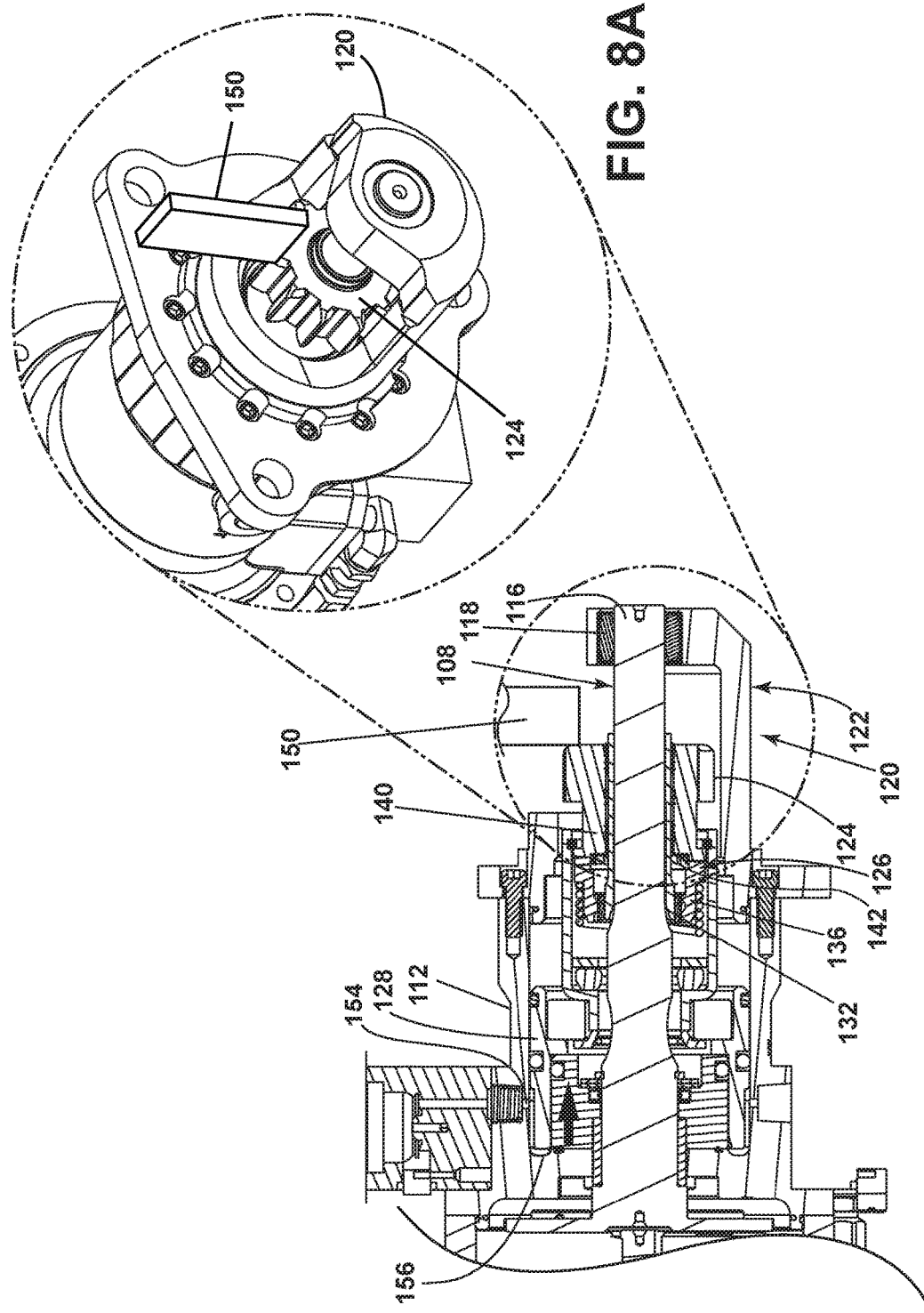
FIG. 8 is a cross-sectional view of a portion of the starter of FIG. 2 with portions in a tooth-to-tooth event, in accordance with various aspects described herein.

The air turbine starter 10 is further designed to provide an indexing function should the pinion gear 124 abut one of the teeth of engine ring gear 150 when being actuated to the right into engagement. FIG. 8 is a cross-sectional view of a portion of the starter in a tooth-to-tooth event. It will be understood that the portion of the air turbine starter 10 illustrated in FIGS. 8-11A is illustrated with the opening in the end housing 120 in the upwards position for clarity purposes.

When pressurized air is introduced into the closed end 156 of the second housing 112 via the aperture 154, the piston 128, indexing assembly 130, clutch assembly 126, and pinion gear 124 are pushed towards the end housing 120 as indicated by the arrow 172. Ultimately, the pinion gear 124 is supposed to mesh with the engine ring gear. However, when there is a tooth-to-tooth event, movement of the pinion gear 124 is obstructed by tooth abutment of the engine ring gear 150. More specifically, the teeth of the pinion gear 124 hit teeth of the engine ring gear 150. Indexing takes place when engagement between the pinion gear 124 and the engine ring gear 150 is not achieved at the first attempt.

Figure 9:
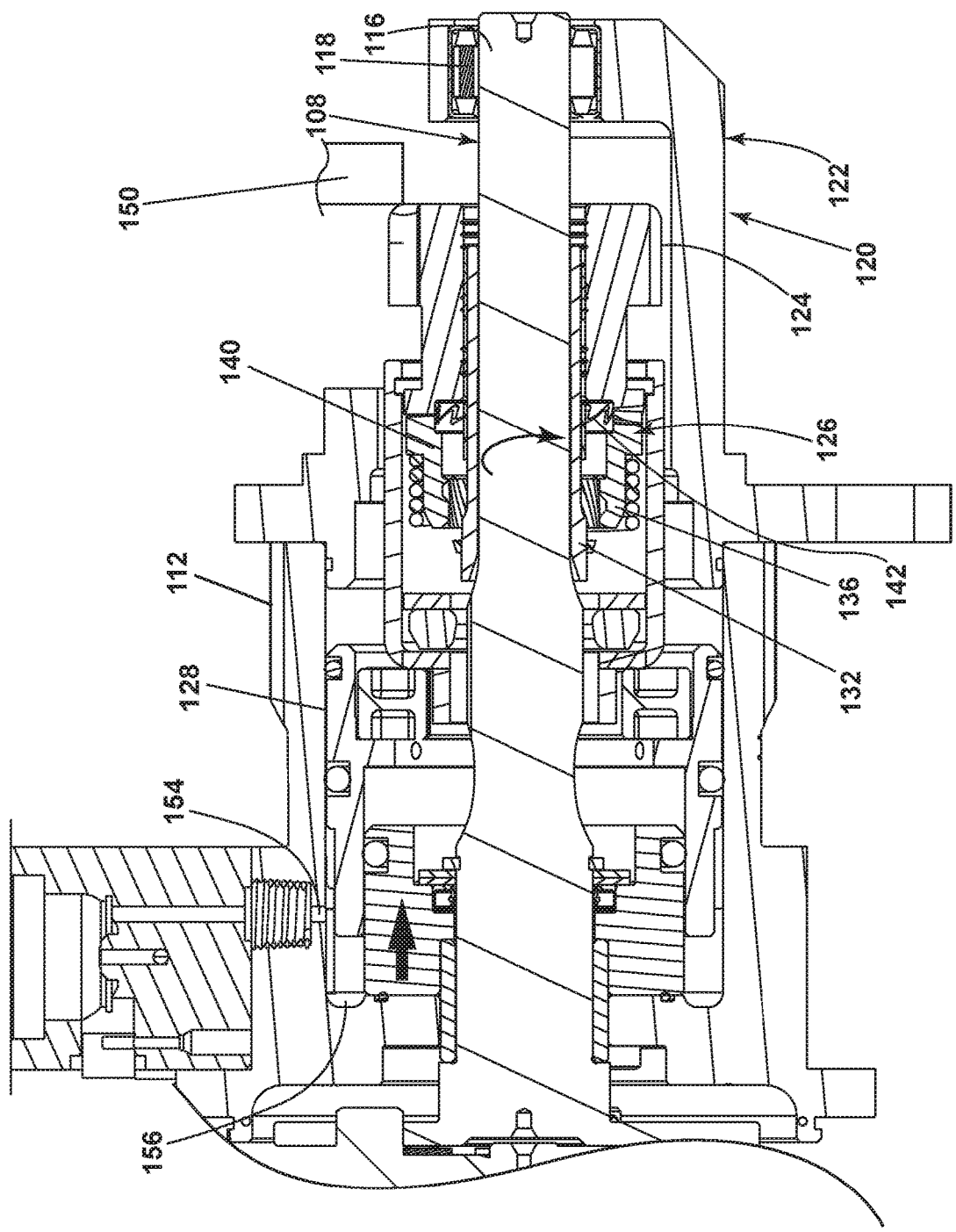
FIG. 9 is a cross-sectional view of the portion of the starter of FIG. 8 illustrating rotation, in accordance with various aspects described herein.

Referring now to FIG. 9, due to the force acting on the piston 128 and the indexing assembly 130, illustrated by arrow 174, an internal mechanism in the indexing assembly 130 rotates inside the dentil clutch spline 136 as illustrated by arrow 176. While the indexing assembly 130 can rotate any suitable amount it is contemplated that the indexing assembly 130 rotates by approximately one half pinion tooth. It will be understood that the pinion gear 124 and the dentil clutch spline 136 remain stationary during the indexing movement.

Figure 10:
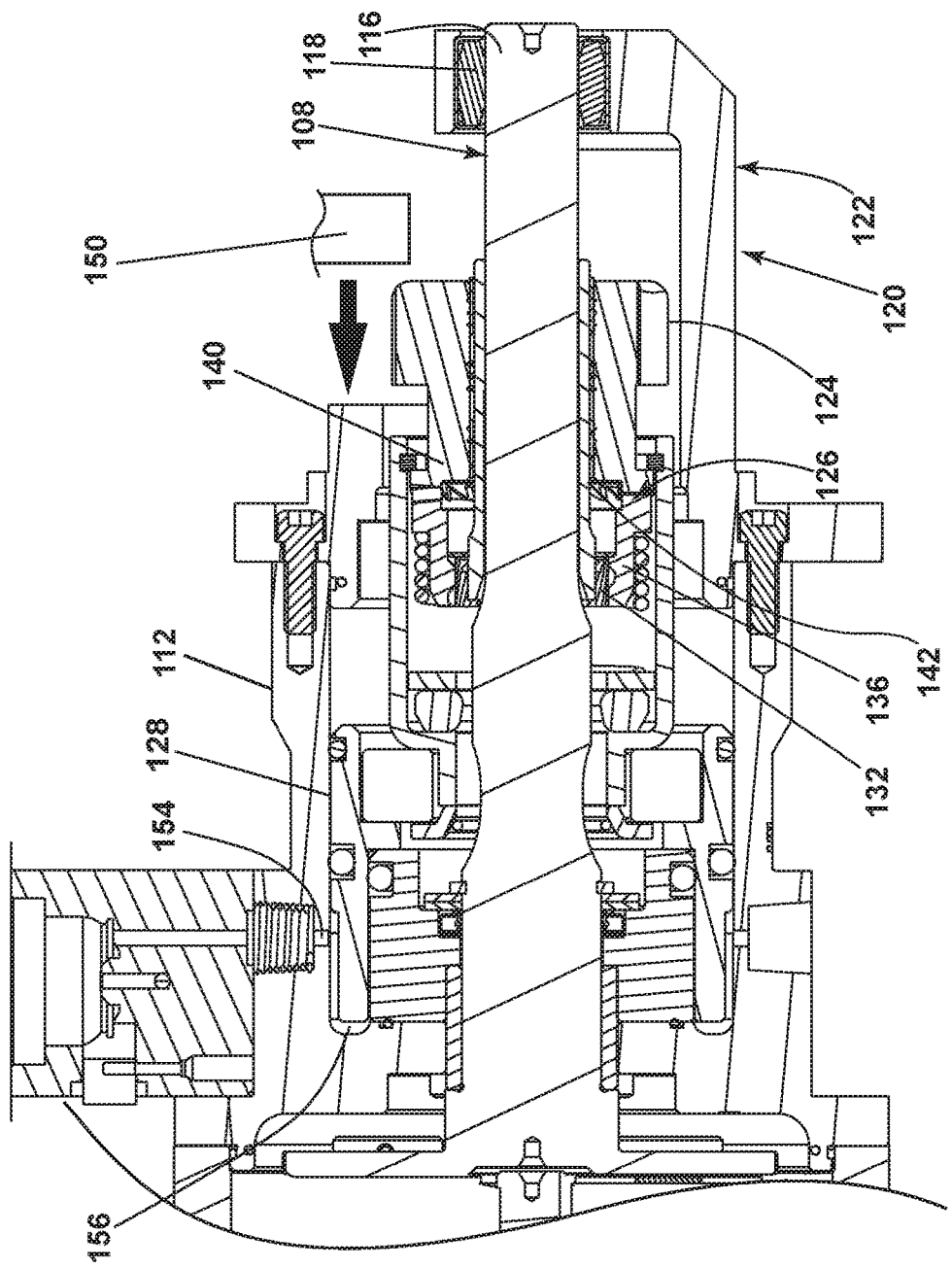
FIG. 10 is a cross-sectional view of the portion of the starter of FIG. 8 illustrating retraction, in accordance with various aspects described herein.

After the tooth-to-tooth event, the piston 128, indexing assembly 130, clutch assembly 126 and pinion gear 124 are retracted away from the end housing 120, as illustrated by arrow 178 in FIG. 10. During this retraction a spring 180 internal to the indexing assembly 130 initiates the re-indexing of the pinion gear 124. The new pinion position is established as the spring unloads during the retraction. Once the pinion gear 124 rotates and achieves the indexed position, the spring 180 pulls back the drive shaft 108 assembly to the completely retracted position and due to the action of the air behind the piston 128, the drive shaft 108 moves forward once more to engage to the engine ring gear 150. A new engagement is then attempted with the pinion gear 124 in a new position based on the indexing. As illustrated in FIG. 11, the pinion gear 124 can properly engage the engine ring gear 150.

Advantages associated with the starter described herein include preventing undesirable back driving of the starter for a turbine engine. By preventing back driving, wear to the parts described herein, in particular the drive shaft and output shaft decrease. Decreasing wear in turn increases the life of the parts. The starter as described herein enable lower maintenance cost and easy repair. The starter gearing mechanism accomplishes all the normal functions of impact cushioning, indexing, overrunning, automatic dentil tooth separation, etc.

The arrangement of the set of outlets about the cylindrical peripheral wall 160 allows for 360 degrees of exhaust out of a variety of ports. In starters with fewer exhaust ports the exhaust is more concentrated and prohibits where that starter can be mounted, or in what orientation it can be mounted in, without blocking or obstructing the ports. Conversely, the set of outlets described above allow for flexibility in mounting the air turbine starter 10. The air turbine starter 10 merely needs to be coupled at several specific points including the inlet 32 and the pinion gear 124. As the inlet assembly 38 can be rotated in any manner so long as an in-line air flow is provided at the inlet 32, this allows for numerous orientations of the air turbine starter 10.

The present disclosure also allows for more power to be extracted from the second stage. In legacy products, the power distribution is typically 70% of power coming from the first stage (a stage is the combination of a stator and a rotor) and only 30% from the second stage. In the present disclosure the power distribution is 54-46%. A combination of the increased nozzles and an offset in the nozzles of the stators allows for the increase of power extracted in the second stage.

A larger output shaft allows the transmission of the larger torque created by this increased extraction of power. More specifically, the present disclosure also allows for a larger diameter drive shaft 108 utilized within a legacy pinion gear. By way of non-limiting example, a diameter of 22.225 millimeters (⅞-inch) can be utilized, which is an increase over typical shaft diameters. Such a larger shaft allows for more distribution of torque. Non-limiting aspects of the disclosure can be included wherein smaller shaft diameters (e.g. smaller than a diameter of 22.225 millimeters, or ⅞-inch) can be utilized. Further still, it is contemplated that a legacy pinion gear can be retro-fitted by enlarging a central opening in the pinion gear, which is adapted to receive a 19.05 millimeter (¾ inch) shaft to define a larger size opening. Once enlarged a shaft that is larger than 19.05 millimeters can then be inserted within or through the larger size opening. The central opening can be enlarged in any suitable manner including by drilling or chemical etching.

Further, breakage of typical shafts having a ¾-inch diameter is typical as operators can attempt to start the air starter multiple times. For example, in certain circumstances the air starter will not start the engine and the operator will attempt to start the air start again while portions of the air starter are still turning. The interaction with the stationary ring gear and the restarted drive shaft having a typical diameter results in a broken shaft that renders the air starter useless. The larger diameter contemplated herein will result in a sturdier product.

Further still, aspects of the present disclosure include a method of forming an air turbine starter including enclosing a turbine member within a peripheral wall between an inlet and a set of outlets to define a fluid pathway and forming a tortuous path between the turbine member and an exterior of the peripheral wall by way of disposing a containment screen between the turbine member and the set of outlets. The tortuous path is arranged such that a fragment is retarded from being ejected trough the set of outlets. This can include stopping or slowing a speed of such a fragment. Further still, aspects disclose that the screen located within the interior can be adapted to mitigate ejection of ignited particles from within the housing. The screen and outlets during use can also form a tortuous path for a spark to follow between the turbine member and an exterior of the peripheral wall.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new examples, whether or not the new examples are expressly described. Combinations or permutations of features described herein are covered by this disclosure. Many other possible aspects of the disclosure and configurations in addition to that shown in the above figures are contemplated by the present disclosure. Additionally, the design and placement of the various components such as starter, AGB, or components thereof can be rearranged such that a number of different in-line configurations could be realized.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An air turbine starter for starting an engine, comprising:
   at least one turbine member that is rotatable about a rotational axis;
   a housing including a peripheral wall, defining an interior and an exterior of the housing;
   the housing having a portion thereof radially surrounding the at least one turbine member and defining a pathway along which a flow of gas passes there through to interact with the at least one turbine member, wherein the housing further includes an inlet and a set of outlets formed in the peripheral wall, and the at least one turbine member is located there between;
   a containment screen located within the interior downstream of the at least one turbine member, the containment screen located axially between the at least one turbine member and the set of outlets; and
   a conically-shaped retention device axially aligned with the set of outlets and axially retaining the containment screen within the interior of the housing;
   wherein the arrangement of the containment screen between the turbine member and the peripheral wall forms a tortuous path between the turbine member and an exterior of the peripheral wall retarding the ejection of fragments carried by the flow of gas.

2. The air turbine starter of claim 1 wherein the containment screen abuts the peripheral wall.

3. The air turbine starter of claim 1 wherein the set of outlets includes a plurality of apertures located in the peripheral wall.

4. The air turbine starter of claim 3 wherein the plurality of apertures are circumferentially spaced about the peripheral wall.

5. The air turbine starter of claim 1 wherein the containment screen comprises a stainless steel containment screen.

6. The air turbine starter of claim 1 wherein the containment screen comprises a perforated plate.

7. The air turbine starter of claim 1 wherein the housing has a wall thickness of 2.54 millimeters (0.100 inch).

8. A method of forming an air turbine starter, the method comprising:
   enclosing a turbine member within a housing that includes a peripheral wall, defining an interior and an exterior, between an inlet and a set of outlets to define a fluid pathway, the housing having a portion thereof radially surrounding the turbine member, and wherein the set of outlets is formed in the peripheral wall;
   forming a tortuous path between the turbine member and the exterior of the peripheral wall by way of disposing a containment screen within the interior of the housing, downstream of the turbine member, wherein the containment screen is located axially between the turbine member and the set of outlets; and
   disposing a conically shaped retention device downstream of the containment screen and axially aligned with the set of outlets;
   wherein the tortuous path is arranged such that a fragment is retarded from being ejected through the set of outlets.

9. The method of claim 8 wherein the set of outlets include a set of outlets spanning at least a portion of a circumference of the peripheral wall.

10. The method of claim 9 wherein the set of outlets span over 270 degrees of the circumference.

11. The method of claim 9 wherein the set of outlets range in size from 15.875 millimeters (5/8 of an inch) to 11.1125 millimeters (7/16 of an inch).

12. The method of claim 8 wherein retarded from being ejected includes slowing a speed of the fragment.

* * * * *